July 21, 1964 J. A. SAFFIR 3,141,650
DENTAL HAND PIECE
Filed May 13, 1963 3 Sheets-Sheet 1

INVENTOR
JACOB A. SAFFIR
BY Frederick W. Turnbull
ATTORNEY

July 21, 1964   J. A. SAFFIR   3,141,650
DENTAL HAND PIECE

Filed May 13, 1963   3 Sheets-Sheet 2

INVENTOR
*JACOB A. SAFFIR*

BY *Frederick W. Turnbull*

ATTORNEY

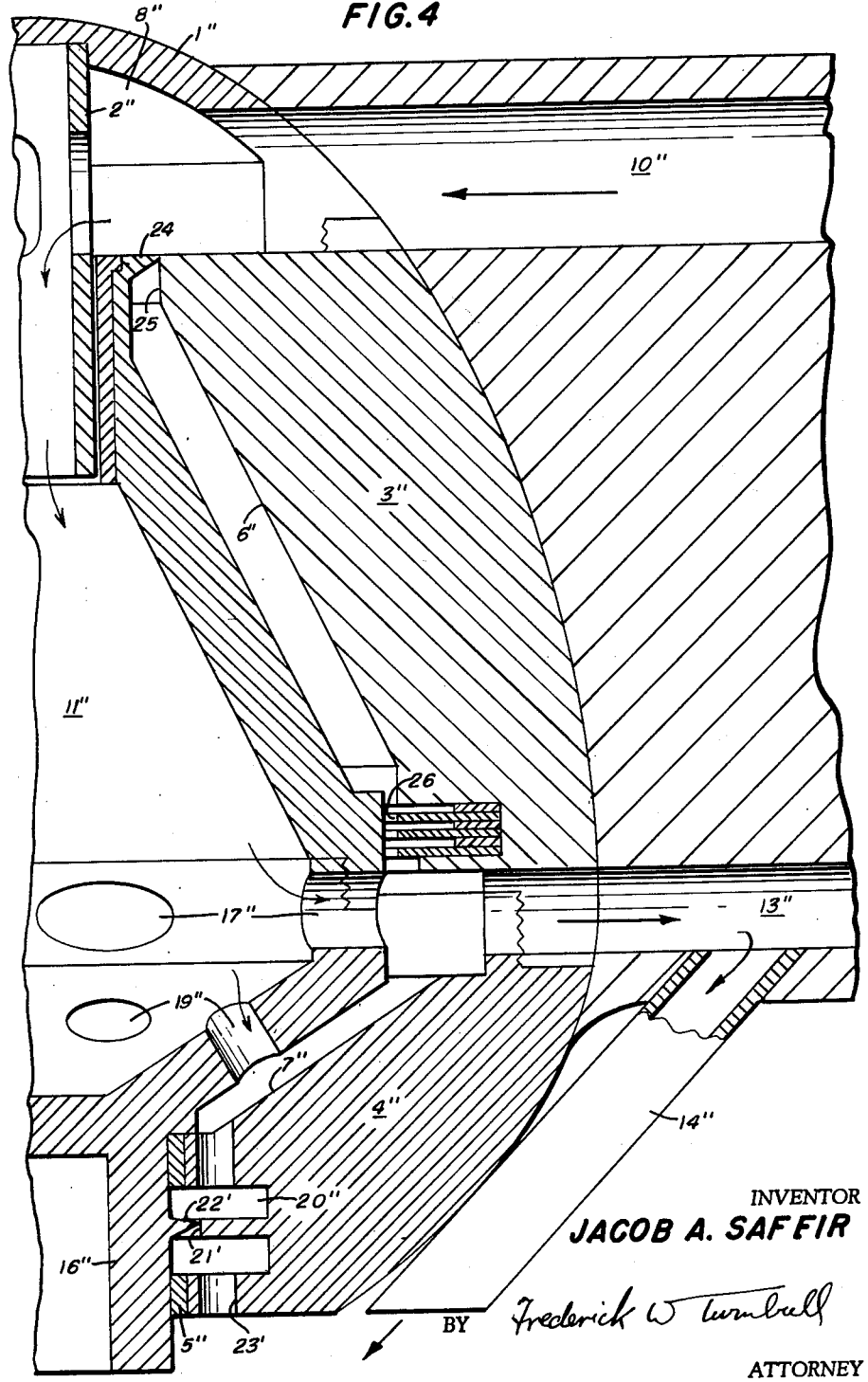

United States Patent Office 3,141,650
Patented July 21, 1964

3,141,650
DENTAL HAND PIECE
Jacob A. Saffir, Los Angeles, Calif., assignor to The Dentists' Supply Company of New York, York, Pa., a corporation of New York
Filed May 13, 1963, Ser. No. 279,731
9 Claims. (Cl. 253—2)

This invention relates to turbines and more specifically to dental turbines to be mounted in a dental hand piece and to rotate a drill or the like, used in dental work.

Air operated hand pieces of this general type are known, where the drill, mounted in the turbine shaft, is rotated upwards of 200,000 r.p.m., but certain mechanical features have caused frequent repairs to be necessary which are both expensive and time consuming. A principal failure is of the thrust bearings which are conventionally of the ball bearing type and are both expensive and short lived.

It is an object of the present invention to provide means by which the thrust of the tool in operation is counteracted by air pressure to relieve any thrust bearings that may be provided of a high proportion of the thrust, or to support the thrust entirely.

It is a further object to provide a turbine in which the rotor may move axially, from a normal position and by such axial movement provide for unbalanced air pressures against the rotor to return the rotor to its normal position.

It is a further object of the present invention to provide a dental turbine operating on the reaction principle rather than on the impulse principle which is used in all the prior art dental turbines, in which a plurality of nozzles is spaced about the turbine rotor to produce the torque of the rotor.

Other and further objects and advantages of the present invention will appear from the following specification taken with the accompanying drawings in which like figures of reference refer to similar elements in several views and in which:

FIGURE 4 is an enlarged fragmentary axial section of a second modification of the device.

Figure 1:
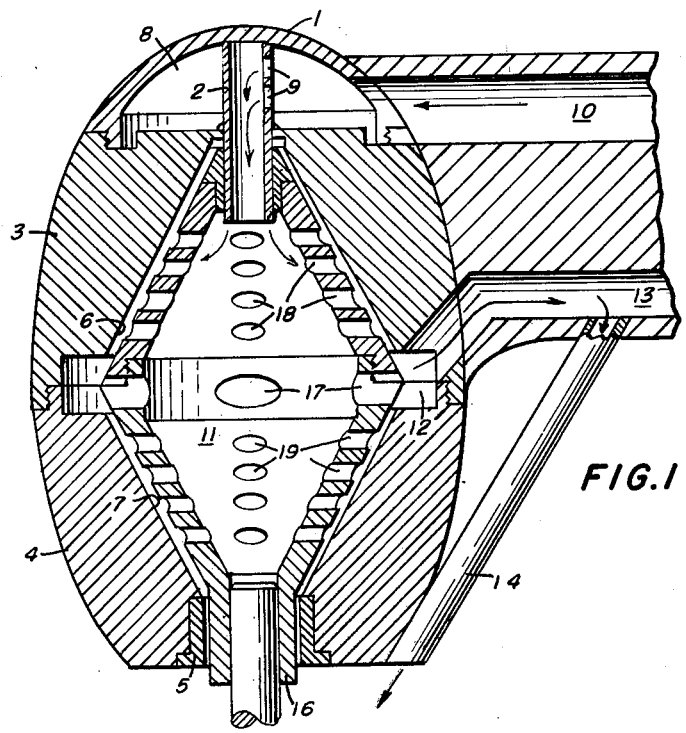
FIGURE 1 is a diagrammatic axial section of a device incorporating the principles of the present invention.

In FIGURE 1 there is a casing made up of an element 1 at the top which carries a central tubular bearing 2 which extends into a top housing element 3 which is secured in turn to a lower housing element 4 which carries a radial bearing 5. Within top housing element 3 there is a conical cavity 6 with a wide base towards bottom housing element 4 in which there is a similar conical cavity 7. The bases of these two cones are towards each other. A space 8 within the top element 1 provides an air chest from which air enters the hollow bearing 2 by way of a plurality of apertures 9 and air supply ducts 10 connect to the air chest 8.

A rotor 11 is mounted within the two conical cavities 6 and 7, the shape of the rotor closely coinciding with the internal shape of the two cavities so that the rotor presents a double-ended configuration, each end being a cone slightly smaller than the conical cavity in which it rotates, and the rotor has its largest diameter at the juncture of conical cavities 6 and 7. Surrounding this largest diameter of the rotor is an exhaust passage 12 which completely surrounds the rotor and from which air may pass through exhaust passage 13 from which a small part of the exhaust air may pass through a tube 14 to be directed against the tool which is to be operated by the turbine. The top end of the rotor, that is, the end of the rotor towards top element 1, is fitted with a bearing aperture which surrounds bearing element 2 and holds the rotor against radial but not against axial movement. The bottom end of the rotor as it extends from bottom housing element 4 is supported against radial movement by bearing element 5 which also does not prevent axial movement of the rotor.

Figure 3:
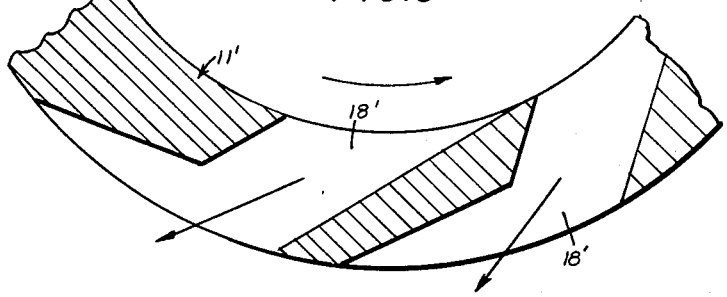
FIGURE 3 is a fragmentary section on the line 3—3 of FIGURE 2.

About the greatest diameter of the rotor is a plurality of nozzle apertures 17 which are formed as shown in FIGURE 3. Further nozzle apertures 18 are provided in the conical upper portion of the rotor 11 and additional nozzles 19 are provided in the lower portion of the rotor. Nozzles 18 and 19 are formed tangential to the rotor in the same direction as are nozzles 17. It will be noted, then, that air flowing out through the nozzles 17 at a high rate of speed will rotate the rotor 11 at a high speed. This will be aided by air flowing outwardly through nozzles 18 and 19. If, however, there is any axial movement of the rotor 11, for instance, upwardly toward top element 1, the space between the rotor and the wall of conical cavity 6 will be diminished and the space between the rotor and the wall of conical cavity 7 will be enlarged. The diminution of the space between the rotor and the wall of cavity 6 will restrict the flow of air from nozzles 18 into the exhaust 12, while the increase in the space between the rotor and the walls of cavity 7 will make the flow of air from nozzles 19 to exhaust 12 much easier. It will thus be seen that the movement of the rotor axially within the cavities 6 and 7 will automatically adjust the flow from nozzles 18 and 19 which in turn will create a counter-axial thrust biasing the rotor back to its normal position.

Figure 2:
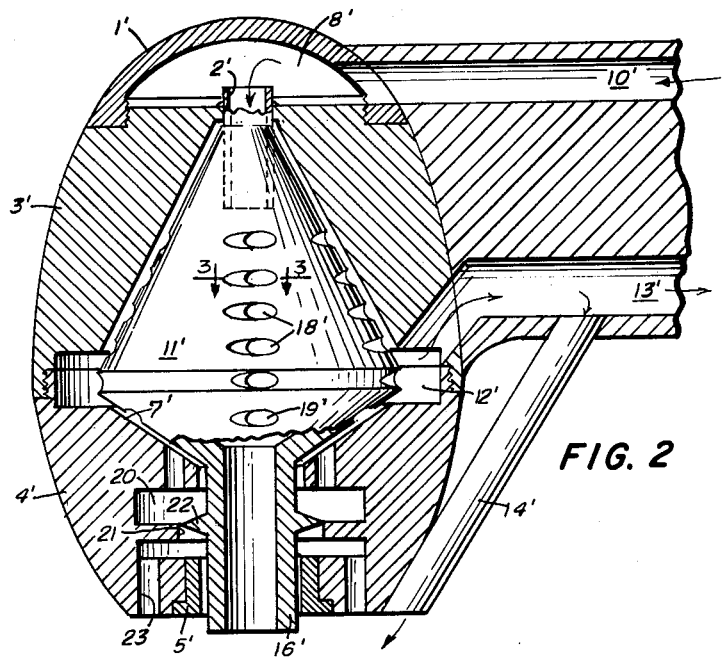
FIGURE 2 is a similar section of a slightly modified variation of the device of the present invention.

Referring now to FIGURE 2, we see that the top element 1', the bearing 2', the top housing element 3', are all identical to the same elements in FIGURE 1, the bottom housing element 4', however, is differently shaped. The conical cavity in element 4' is a much flatter cone than is seen in element 4 of FIGURE 1. Other differences in element 4' are seen in FIGURE 2 which will be discussed below. It will be noted, however, at this time that the element 4 in FIGURE 1 may be provided with a much flatter cone than is shown in FIGURE 1, that is, a cone substantially as seen in FIGURE 2. It will be seen in FIGURE 2 that as the rotor moves a distance upwardly towards top element 1', the normal distance between the upper conical portion of the rotor 11' and the upper conical surface of housing element 3' will vary more slowly than the distance between the walls of the lower conical portion of the rotor and the walls of conical cavity 7'. The flatter the cone of the lower portion of the rotor is, the greater the differential will be between the opposing conical surfaces of the rotor and the two conical walls of the housing. Thus, it will be seen that as the flow from nozzles 18' of the upper portion of the rotor are restricted upon movement of the rotor upwardly, so that air flowing from the nozzles 18' will have greater difficulty in escaping to the exhaust channel 12', the nozzles 19', however, will be moved more rapidly away from the corresponding wall of cavity 7' so that resistance to flow from nozzles 19' will be reduced more rapidly than the resistance to flow will be increased through nozzles 18'. It will thus be seen that axial thrust upwardly on the rotor in FIGURE 2 will be more strongly resisted by the change of air pressures in and around the rotor to resist upward movement than would be developed to resist downward movement.

In using a dental turbine, it is at once apparent that the turbine in use, rotating a drill mounted in end 16 of the rotor, an upward thrust will be developed when the drill is pressed against a tooth, but when the drill is not pressed against a tooth, there will be no downward thrust on the rotor. When the rotor is in motion but not under load, the rotor will be automatically positioned in its median position on bearings 2 and 5. In FIGURE 2 below the cavity 7' a further space 20 is provided in communication with the lower portion of cavity 7'. The bottom of this space 20 provides a valve seat 21 and on the shaft of the rotor is fixed a valve element 22. As seen from FIGURE 2, upon movement of the rotor axially downwardly the valve element 22 approaches the valve seat element 21 to constrict the passage of air from cavity 7' through cavity 20 and past the valve seat 21. Below valve seat 21 are provided exhaust ports 23 so that, as will immediately be seen, if the rotor is moved upwardly under the influence of a drill or tool in shaft 16 the space between valve seat 21 and valve element 22 will be increased to provide free passage of air from the cavity 7' which will operate to unbalance the air pressure surrounding the rotor 11' to create a downward bias on the rotor.

Referring now to FIGURE 4, we see a somewhat different arrangement of the upper portion of the rotor 11". The lower portion of the rotor including nozzle 19" may be exactly like that of FIGURE 2. The upper conical portion of the rotor in this case is made imperforate so that it does not have any nozzles therein. The top end of the rotor is provided with a valve element 24 which projects radially outwardly from the top edge of the rotor towards a cylindrical surface 25 which is spaced from a bearing element 2" with a very small clearance between elements 24 and the cylindrical surface 25. At the lower end of the upper conical portion of rotor 11" is seen labyrinth packing 26 which surrounds a cylindrical surface on the rotor. It will be seen that upon upward movement of rotor 11" in FIGURE 4, the valve element 24 will rise above the cylindrical surface 25 thus admitting full pressure air from air chest 8" into the space between the rotor and the cavity walls 6". This pressure between the wall of the rotor and the wall of the top housing element will immediately balance the pressure within the rotor 11" which in turn will unbalance the pressures operating on the rotor 11". The space between the bottom conical surface of the rotor and the internal conical surface of the bottom housing 7" will be relieved by widening of the space between rotor 11" and the wall of housing chest 4". This unbalance of air pressure surrounding and within the rotor 11" will clearly cause an air pressure bias of the rotor to return it to its normal operating position.

A valve may be provided at the lower end of rotor 11" similar to the valve seen in FIGURE 2. Valve element 22' on shaft 16" cooperates with cylidnrical surface 21' so that when the rotor 11" is moved upwardly the space between the lower face of rotor 11" and housing element 4" is vented via 20', past valve 21', 22', and out to atmosphere via passage 23'.

The labyrinth packing 26 will restrict the flow of air downwardly from the conical cavity 6", yet will not have any braking effect on the rotor.

Figure 5:
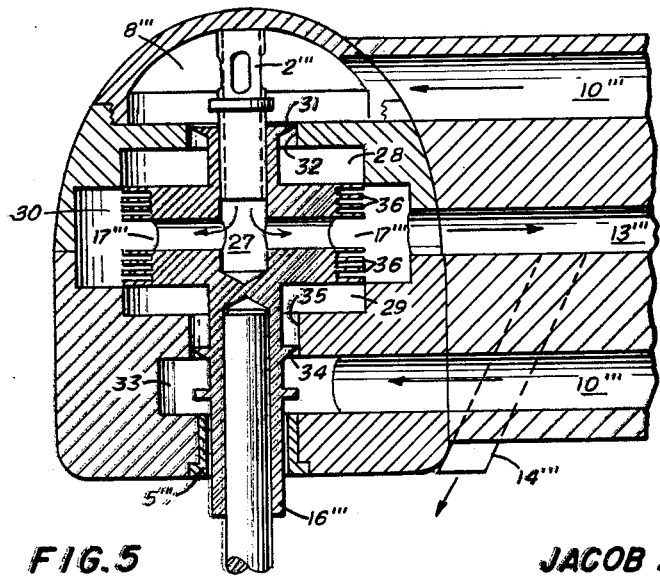
FIGURE 5 is a diagrammatic axial section of a third modification of the device.

FIGURE 5 is a variation of the FIGURE 4 arrangement. In FIGURE 5 rotor 27 operates similarly to rotor 11", on an upper support 2'" and a lower bearing 5'". Rotor 27, however, is cylindrical and rotates in a cylindrical cavity in the housing. The upper portion of the housing is designated 28 and the lower portion is designated as 29. The rotor is surrounded by an exhaust passage 30 of substantially the same axial extent as rotor 27 so that, when rotor 27 is centered axially, the pressure in upper and lower portions 28 and 29 is the same as in exhaust passage 30. A valve element 31 is mounted on rotor 27 surrounding support 2'" spaced from the body of the rotor 27 a distance greater than the axial extent of portion 28 of the cylindrical cavity. Valve element 31 normally lies opposite a cylindrical surface 32, and, when the rotor 27 is axially centered with respect to the exhaust passage 30, the valve element 31 is just below the end of cylindrical surface 32 that is nearest the air chest 8'" which is the equivalent of air chest 8 of FIGURE 1.

A second air chest 33 is provided at the lower end of the turbine surrounding shaft 16'". Valve element 34 cooperates with a cylindrical surface 35 in precisely the same manner as valve 31 cooperates with cylindrical surface 32 except, of course, in the opposite direction.

A plurality of grooves 36 are shown in the cylindrical periphery of rotor 27 both above and below tangential nozzles 17'". These grooves form, with the cylindrical walls of the upper, or the lower portion of the cavity in which the rotor operates, a labyrinth packing that increases in efficacy as the rotor moves axially from its normal median position in either direction. The labyrinth may, of course, be provided by the configuration of the walls of portions 28 and 29 instead of by the configuration of rotor 27.

If, under stress of an upward thrust on shaft 16'" the rotor 27 is moved upwardly the valve element 31 will move upwardly to open the passage bounded by cylindrical surface 32 to air pressure from air chest 8'". Simultaneously the upper corner of rotor 27 will move into portion 28 and air pressure will build up in upper portion 28 because of the constriction caused by the rotor overlapping the cylindrical wall of portion 28. At the same time the rotor will move further out of portion 29 so that the portion 29 will be subject only to the exhaust air pressure. The axial thrust, then on shaft 16'" will be resisted by high pressure air against the top of the rotor, while the pressure on the bottom of the rotor is reduced to exhaust pressure.

Means may be provided to limit the axial movement of the rotor along the axis thereof but such means would be positioned at the extreme end of any movement of the rotor and would not take effect until after the air pressures in and around the rotor have become unbalanced to the greatest extent possible to produce the maximum return bias. Since such elements are not a part of this invention and are in any case conventional, they are not shown nor discussed. It will be seen, therefore, that a novel and useful air-driven dental turbine is provided in which by permitting axial movement of the rotor an unbalance of air forces is created which biases the rotor back towards its normal position, thus eliminating the need for thrust bearings under most operating conditions.

It will be seen, then, that there is provided an air turbine, suitable for use in a dental hand piece, in which an end thrust on the shaft will be opposed by the air pressure used to drive the turbine. The turbine may, of course, be adjusted for uses other than in a dental hand piece.

I therefore claim:

1. A dental turbine comprising a housing, a rotor, a bearing at each end of said rotor holding said rotor against radial movement in said housing, said rotor having a portion of greatest diameter between said bearings and a generally conical tapered wall between said portion of greatest diameter and each said bearing, said rotor being provided with an internal cavity, and with a plurality of tangential nozzles extending from said cavity to said portion of greatest diameter, said housing having an interior shape generally complementary to the shape of said rotor comprising coaxial conical portions surrounding and spaced from the conical walls of said rotor, and having an annular enlarged exhaust passage surrounding said portion of greatest diameter opposite said tangential nozzles, one of said bearings being provided with an air passage leading to said internal cavity, means to provide air under pressure to said air passage, and means to adjust the air pressure between the conical walls of said rotor and the conical walls of said housing according to the axial position of said rotor in said housing, whereby said rotor is biased by air pressure in a direction contrary to its axial movement.

2. The dental turbine of claim 1 in which said means to adjust the air pressure includes ancillary nozzles provided in the conical walls of said rotor opposite the complementary conical walls of said housing.

3. The dental turbine of claim 1 in which valve means is provided at adjacent at least one of said bearings operated by axial movement of said rotor, whereby air passes said bearing when said rotor moves axially.

4. A dental turbine comprising a housing, a rotor provided with internal walls to form a central cavity, means to introduce air under pressure into said cavity, a bearing at each end of said rotor holding said rotor against radial movement in said housing, said rotor having a cylindrical portion of greatest diameter between said bearings, and a portion of minimum diameter between said portion of greatest diameter and each said bearing, a valve flange on said rotor at each end thereof extending radially outwardly from each said portion of minimum diameter at a point remote from said portion of greatest diameter, a housing having a cavity for enclosing said rotor, said housing including bearing means cooperating with the bearing means on said rotor, a cavity at each end of said housing adjacent said bearings providing an air chest at each end of said housing, a housing flange extending radially inwardly from said housing at each end to separate said air chest at each end from said cavity for enclosing said rotor, each said housing flange presenting a cylindrical surface toward the corresponding valve flange to provide a minute radial clearance between said valve flange and said housing flange, the said housing flanges being spaced from each other a distance such that when the rotor is centered in said cavity enclosing it the said valve flanges are positioned opposite the ends of the cylindrical surface of the corresponding housing flange remote from said cavity enclosing said rotor, said cavity enclosing said rotor having a diameter substantially the same as the diameter of said portion of greatest diameter to provide a minimum clearance between said portion of greatest diameter and said cavity enclosing said rotor, an annular exhaust passage surrounding said portion of greatest diameter of an axial length approximating the axial length of said portion of greatest diameter, said rotor being provided with a plurality of tangential nozzles leading from said central cavity of said rotor to said portion of greatest diameter and a passage from one of said air chests to said central cavity of said rotor.

5. A dental turbine comprising a housing, a rotor provided with internal walls to form a central cavity, means to introduce air under pressure into said cavity, a bearing at each end of said rotor holding said rotor against radial movement in said housing, said rotor having a cylindrical portion of greatest diameter between said bearings, and a portion of minimum diameter between said portion of greatest diameter and each said bearing, a valve flange on said rotor at each end thereof extending radially outwardly from each said portion of minimum diameter at a point remote from said portion of greatest diameter, a housing having a cavity for enclosing said rotor, said housing including bearing means cooperating with the bearing means of said rotor, a housing flange extending radially inwardly from said housing at each end to provide end walls for said cavity enclosing said rotor, each said housing flange presenting a cylindrical surface toward the corresponding valve flange to provide a minute radial clearance between said valve flange and said housing flange, said cavity enclosing said rotor having a diameter substantially the same as the diameter of said portion of greatest diameter to provide a minimum clearance between said portion of greatest diameter and said cavity enclosing said rotor, an annular exhaust passage surrounding said portion of greatest diameter of an axial length approximating the axial length of said portion of greatest diameter, said rotor being provided with a plurality of tangential nozzles leading from said central cavity of said rotor to said portion of greatest diameter and a passage from one of said air chests to said central cavity of said rotor.

6. The dental turbine of claim 4, including also labyrinth means operating between said rotor and said cavity upon axial movement of said rotor, whereby air flows between said rotor and said internal walls forming said cavity.

7. A dental turbine comprising a housing, a rotor, a bearing at each end of said rotor holding said rotor against radial movement in said housing, said rotor having a portion of greatest diameter between said bearings and an end wall between said portion of greatest diameter and each said bearing, said rotor being provided with an internal cavity, and with a plurality of tangential nozzles extending from said cavity to said portion of greatest diameter, said housing having an interior shape generally complementary to the shape of said rotor surrounding and spaced from the end walls of said rotor, and having an annular enlarged exhaust passage surrounding said portion of greatest diameter opposite said tangential nozzles, one of said bearings being provided with an air passage leading to said internal cavity, means to provide air under pressure to said air passage, and means to adjust the air pressure between the end walls of said rotor and the walls of said housing according to the axial position of said rotor in said housing, whereby said rotor is biased by air pressure in a direction contrary to its axial movement.

8. A dental turbine comprising a housing, a rotor provided with internal walls to form a central cavity, means to introduce air under pressure into said cavity, a bearing at each end of said rotor holding said rotor against radial movement in said housing, said rotor having a cylindrical portion of greatest diameter between said bearings, and a portion of minimum diameter between said portion of greatest diameter and each said bearing, a valve means at each end of said rotor, a housing having a cavity for enclosing said rotor, said housing including bearing means cooperating with the bearing means of said rotor, a valve seat means at each end to provide end walls for said cavity enclosing said rotor, each said valve means presenting a cylindrical surface toward the corresponding valve means to provide a minute radial clearance between said valve means and said valve seat means, said cavity enclosing said rotor having a diameter substantially the same as the diameter of said portion of greatest diameter to provide a minimum clearance between said portion of greatest diameter and said cavity enclosing said rotor, an annular exhaust passage surrounding said portion of greatest diameter of an axial length approximately the axial length of said portion of greatest diameter, said rotor being provided with a plurality of tangential nozzles leading from said central cavity of said rotor to said portion of greatest diameter and a passage from one of said air chests to said central cavity of said rotor.

9. A dental turbine comprising a housing, a rotor having axial ends, and a portion of greatest diameter, bearing means supporting said rotor within said housing to prevent radial motion of said rotor in said housing, a cavity within said rotor, means to provide fluid under pressure to said cavity, tangential nozzle means extending from said cavity through said rotor to said portion of greatest diameter whereby said rotor is revolved, means to apply fluid pressure within said housing to said axial ends of said rotor and valve means actuated by axial movement of said rotor to cause unbalance of the fluid pressure against said axial ends to bias said rotor axially in a direction opposite to the direction of the axial movement.

References Cited in the file of this patent
UNITED STATES PATENTS

| | | |
|---|---|---|
| 2,602,632 | Serduke et al. | July 8, 1952 |
| 3,088,707 | Williams et al. | May 7, 1963 |
| 3,105,164 | Favrot | Sept. 24, 1963 |